(12) United States Patent
Horiba et al.

(10) Patent No.: US 12,474,153 B2
(45) Date of Patent: Nov. 18, 2025

(54) MEASUREMENT METHOD

(71) Applicants: TOYOTA JIDOSHA KABUSHIKI KAISHA, Toyota (JP); Primearth EV Energy Co., Ltd., Kosai Shizuoka (JP); Prime Planet Energy & Solutions, Inc., Tokyo (JP)

(72) Inventors: Keito Horiba, Toyota (JP); Taichi Urakami, Nissin (JP); Seiji Ishizu, Toyota (JP); Kazutoshi Iwata, Ichinomiya (JP); Masakazu Umehara, Toyota (JP); Naoya Kishimoto, Nagoya (JP)

(73) Assignees: TOYOTA JIDOSHA KABUSHIKI KAISHA, Toyota (JP); TOYOTA BATTERY CO., LTD, Kosai (JP); PRIME PLANET ENERGY & SOLUTIONS, INC., Tokyo (JP)

( * ) Notice: Subject to any disclaimer, the term of this patent is extended or adjusted under 35 U.S.C. 154(b) by 364 days.

(21) Appl. No.: 18/214,737

(22) Filed: Jun. 27, 2023

(65) Prior Publication Data

US 2024/0011754 A1 Jan. 11, 2024

(30) Foreign Application Priority Data

Jul. 6, 2022 (JP) ................. 2022-109008

(51) Int. Cl.
*G01B 5/06* (2006.01)
*G01B 3/00* (2006.01)
*G01B 5/14* (2006.01)

(52) U.S. Cl.
CPC ............. *G01B 5/14* (2013.01); *G01B 3/002* (2013.01)

(58) Field of Classification Search
CPC ............. G01B 5/06; G01B 5/068; G01B 5/14
(Continued)

(56) References Cited

U.S. PATENT DOCUMENTS 2,794,951 A * 6/1957 Broding ................. E21B 47/04
33/732
3,729,985 A * 5/1973 Sikorra .................... G01B 7/24
73/826
(Continued)

FOREIGN PATENT DOCUMENTS

JP H04-364410 A 12/1992
JP H09-159438 A 6/1997
(Continued)

*Primary Examiner* — George B Bennett
(74) *Attorney, Agent, or Firm* — Dinsmore & Shohl LLP

(57) ABSTRACT

A measurement method includes a step of measuring an object to be measured and a reference object by a first measurement unit and a second measurement unit. The first measurement unit has a first displacement meter and a second displacement meter that face each other in a first direction and measure the distance from the object to be measured. The second measurement unit has a third displacement meter and a fourth displacement meter that face each other in the first direction and measure the distance from the reference object. A frame-like supporting member includes a first frame portion supporting the first displacement meter and the third displacement meter, a second frame portion supporting the second displacement meter and the fourth displacement meter, and a third frame portion and a fourth frame portion that connect both end portions of the first frame portion and the second frame portion to each other.

1 Claim, 3 Drawing Sheets

(58) Field of Classification Search
USPC .................................................. 33/732, 733
See application file for complete search history.

(56) References Cited

U.S. PATENT DOCUMENTS

| | | | | |
|---|---|---|---|---|
| 4,095,063 | A * | 6/1978 | Herzhoff | G01B 5/068 19/0.24 |
| 4,107,847 | A * | 8/1978 | Typpo | G01B 5/068 33/501.02 |
| 6,000,693 | A * | 12/1999 | Tranquilla | G01B 7/06 271/274 |
| 6,038,028 | A * | 3/2000 | Grann | G01B 11/0691 356/630 |
| 6,068,209 | A * | 5/2000 | Nakamura | B65H 23/063 242/563.2 |
| 6,100,986 | A * | 8/2000 | Rydningen | G01B 11/022 356/630 |
| 6,281,679 | B1 * | 8/2001 | King | G01B 21/08 324/229 |
| 6,619,137 | B2 * | 9/2003 | Yamamoto | G01B 21/06 73/849 |
| 8,681,345 | B2 * | 3/2014 | Buehler | G01B 11/06 356/630 |
| 11,351,584 | B2 * | 6/2022 | Ishiyama | B21B 37/52 |
| 2020/0140217 | A1 * | 5/2020 | Fukasawa | B65H 35/04 |
| 2023/0384077 | A1 * | 11/2023 | Takai | H01L 21/68 |

FOREIGN PATENT DOCUMENTS

| | | |
|---|---|---|
| JP | 2007-078426 A | 3/2007 |
| JP | 2007-298504 A | 11/2007 |
| JP | 2019-002721 A | 1/2019 |

* cited by examiner

MEASUREMENT METHOD

CROSS-REFERENCE TO RELATED APPLICATION

This application claims priority to Japanese Patent Application No. 2022-109008 filed on Jul. 6, 2022, incorporated herein by reference in its entirety.

BACKGROUND

1. Technical Field

The disclosure relates to a measurement method using a displacement meter.

2. Description of Related Art

As a measurement method using a displacement meter of the related art, a method of disposing two head units such that the two head units face each other and measuring the thickness of an object to be measured positioned between those two head units is disclosed in Japanese Unexamined Patent Application Publication No. 2019-2721.

SUMMARY

However, in JP 2019-2721 A, a specific structure of a supporting tool that supports the two head units has not been sufficiently considered. Therefore, when the ambient temperature changes, there is a fear that the supporting tool may thermally deform and a measurement error may occur depending on the shape of the supporting tool.

The disclosure has been made in view of the problem as described above, and an object of the disclosure is to provide a measurement method of a target to be measured using a displacement meter, the measurement method being able to reduce a measurement error due to the change of ambient temperature.

A measurement method on the basis of the disclosure includes a step of preparing an object to be measured having a first surface to be measured and a second surface to be measured that are opposite each other, and a reference object having a first reference surface and a second reference surface that are opposite each other, and a step of measuring the object to be measured and the reference object by a first measurement unit and a second measurement unit supported by a frame-like supporting member. The first measurement unit has a first displacement meter and a second displacement meter disposed to face each other in a first direction. The second measurement unit has a third displacement meter and a fourth displacement meter disposed to face each other in the first direction. The first measurement unit and the second measurement unit are supported by the frame-like supporting member in a state of being arranged side by side in a second direction orthogonal to the first direction.

The step of preparing the object to be measured and the reference object includes disposing the object to be measured such that the first surface to be measured faces the first displacement meter and the second surface to be measured faces the second displacement meter and disposing the reference object such that the first reference surface faces the third displacement meter and the second reference surface faces the fourth displacement meter. The step of measuring the object to be measured and the reference object includes measuring the distance from the first surface to be measured and the distance from the second surface to be measured by the first displacement meter and the second displacement meter, respectively, and measuring the distance from the first reference surface and the distance from the second reference surface by the third displacement meter and the fourth displacement meter, respectively.

A member including a first frame portion that supports the first displacement meter and the third displacement meter on one side in the first direction, a second frame portion that supports the second displacement meter and the fourth displacement meter on the other side in the first direction, a third frame portion that connects end portions of the first frame portion and the second frame portion to each other on one side in the second direction, and a fourth frame portion that connects end portions of the first frame portion and the second frame portion to each other on the other side in the second direction is used as the frame-like supporting member.

When the measurement method is used, a member in which both ends of the first frame portion and the second frame portion in the second direction are connected to each other by the third frame portion and the fourth frame portion is used as the supporting member that supports the first measurement unit and the second measurement unit. As a result, even when the supporting member is thermally deformed due to the change of the ambient temperature, the deformation amount of the supporting member can be reduced. As a result, the fluctuation in the positions of the first displacement meter and the second displacement meter and the fluctuation in the positions of the third displacement meter and the fourth displacement meter can be reduced, and the measurement error can be reduced.

According to the disclosure, it is possible to provide the measurement method of the target to be measured using the displacement meter, the measurement method being able to reduce the measurement error due to the change of the ambient temperature.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
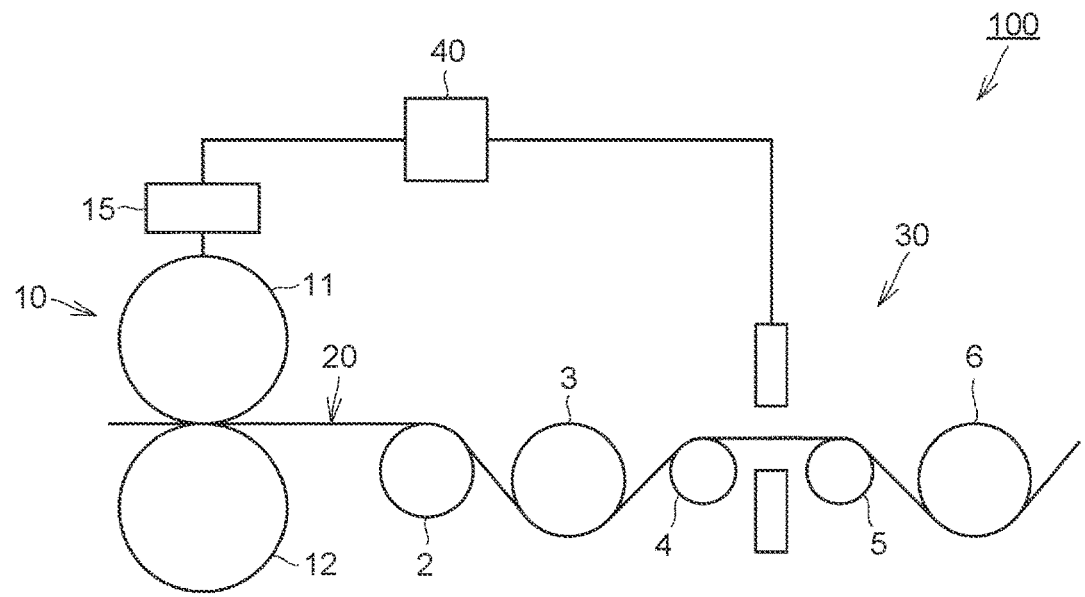
FIG. 1 is a schematic view showing an outline of a manufacturing system that manufactures an electrode sheet according to an embodiment.

An embodiment of the disclosure is described in detail below with reference to the drawings. In the embodiment described below, the same or common parts are denoted by the same reference characters in the drawings and the description thereof is not repeated. In the embodiment described below, a case where the disclosure is applied to a thickness measurement unit that measures the thickness of an electrode sheet on which an active material layer is formed in a step of manufacturing an electrode sheet to be used in a secondary battery is described as an example, but the object to be measured is not limited to the electrode sheet.

FIG. 1 is a schematic view showing an outline of a manufacturing system that manufactures an electrode sheet according to the embodiment. A manufacturing system 100 that manufactures an electrode sheet is described with reference to FIG. 1.

As shown in FIG. 1, the manufacturing system 100 includes a press machine 10, a plurality of conveyance rollers 2 to 6, a thickness measurement unit 30, and a control unit 40. In the manufacturing system 100, an electrode sheet 20 conveyed by the plurality of conveyance rollers 2 to 6 and the like is pressed by the press machine 10, and active material layers 22, 23 (see FIG. 2) are fixed to metal foil 21 (see FIG. 2) as described later. Next, the electrode sheet 20 on which the active material layers 22, 23 are fixed is conveyed to the thickness measurement unit 30, and the thickness of the electrode sheet 20 is measured.

The press machine 10 includes a first roller 11 and a second roller 12, and a pressure adjustment mechanism 15. The first roller 11 and the second roller 12 are disposed to face each other. The first roller 11 and the second roller 12 sandwich a coating portion coated with the active material layers 22, 23, to thereby press the coating portion.

The pressure adjustment mechanism 15 adjusts the pressure by which the first roller 11 and the second roller 12 press the coating portion by adjusting the position of the first roller 11 in the direction in which the first roller 11 and the second roller 12 face each other. The pressure of the first roller 11 and the second roller 12 can be detected by a pressure detection unit (not shown).

The thickness measurement unit 30 is disposed on the downstream side of the press machine 10 in the conveyance direction of the electrode sheet 20. The thickness measurement unit 30 is disposed between the conveyance roller 4 and the conveyance roller 5 in the conveyance direction. The thickness measurement unit 30 measures the thickness of the electrode sheet 20 in a state in which tension is adjusted by a tension control apparatus (not shown).

The result measured by the thickness measurement unit 30 is input to the control unit 40. The control unit 40 controls the operation of the pressure adjustment mechanism 15 on the basis of the input measurement result.

Figure 2:
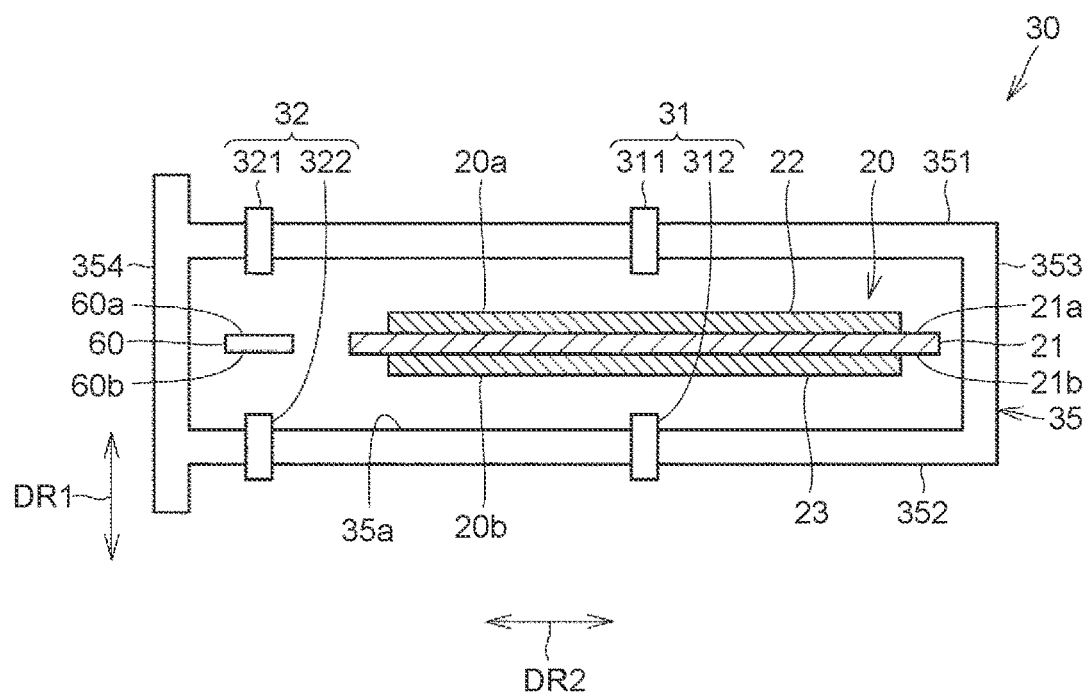
FIG. 2 is a schematic view of a thickness measurement unit according to the embodiment.

FIG. 2 is a schematic view of the thickness measurement unit according to the embodiment. A specific configuration of the thickness measurement unit 30 is described with reference to FIG. 2.

As shown in FIG. 2, the thickness measurement unit 30 includes a first measurement unit 31, a second measurement unit 32, and a frame-like supporting member 35.

The first measurement unit 31 has a first displacement meter 311 and a second displacement meter 312 disposed to be spaced apart from each other in a first direction (direction DR1 in FIG. 2). The second measurement unit 32 has a third displacement meter 321 and a fourth displacement meter 322 disposed to be spaced apart from each other in the first direction. The first direction may be a vertical direction.

The first measurement unit 31 and the second measurement unit 32 are supported by the supporting member 35 in a state of being arranged side by side in a second direction (direction DR2 in FIG. 2) orthogonal to the first direction.

The first displacement meter 311, the second displacement meter 312, the third displacement meter 321, and the fourth displacement meter 322 are optical displacement meters such as a confocal displacement meter, for example. The confocal displacement meter is an optical gauging apparatus that gauges the displacement of an object to be gauged by using the confocal principle in which light to be received is narrowed down to light reflected from an imaging plane on which an image of a light source is formed, and the phenomenon of axial chromatic aberration in which a color shift in the optical axis direction occurs in the image of the light source.

The confocal displacement meter is configured by a pinhole from which light from the light source is output as a point light source, an optical member that causes axial chromatic aberration in detection light output via the pinhole and converges the detection light toward the object to be measured, and a spectrometer that disperses light reflected from the object to be measured and generates a light receiving signal. Light having a plurality of wavelengths, for example, white light is used as the detection light. The pinhole causes detection light in a wavelength that is brought into focus and reflected on the object to be measured out of detection light applied to the object to be measured via the optical member to pass therethrough.

The position of the imaging plane differs for each wavelength due to axial chromatic aberration. Therefore, the displacement of the object to be measured is obtained as a result of determining the wavelength of the detection light passing through the pinhole. The displacement is the distance from a predetermined position that is set in advance to the object to be measured in the optical axis direction. The thickness and the like of the object to be measured can be measured as a result of obtaining the displacement.

The first measurement unit 31 measures the thickness of the electrode sheet 20 as the object to be measured. The electrode sheet 20 includes the metal foil 21 and the active material layers 22, 23. The active material layer 22 is formed on a front surface 21a of the metal foil 21, and the active material layer 23 is formed on a rear surface 21b of the metal foil 21.

The electrode sheet 20 has a first surface to be measured 20a and a second surface to be measured 20b that are opposite each other. The first surface to be measured 20a and the second surface to be measured 20b face each other in the first direction in a measurement position. In the measurement position, the first surface to be measured 20a faces the first displacement meter 311, and the second surface to be measured 20b faces the second displacement meter 312. When the thickness of the electrode sheet 20 is to be measured, the first displacement meter 311 measures the distance from the first surface to be measured 20a, and the second displacement meter 312 measures the distance from the second surface to be measured 20b.

The first surface to be measured 20a is configured by a main surface of the active material layer 22 positioned on the side opposite from the side on which the metal foil 21 is positioned. The second surface to be measured 20b is configured by a main surface of the active material layer 23 positioned on the side opposite from the side on which the metal foil 21 is positioned.

The metal foil 21 has a strip-like shape. The metal foil 21 is aluminum foil, copper foil, or the like. The active material layers 22, 23 may be a negative-electrode active material layer or may be a positive-electrode active material layer.

The negative-electrode active material layer includes negative-electrode active material particles and a binder.

The negative-electrode active material particles may be a carbon-based negative-electrode active material such as graphite, easily-graphitizable carbon and hardly-graphitizable carbon or may be an alloy-based negative-electrode active material containing silicon (Si), tin (Sn), and the like, for example. The binder may be carboxymethyl-cellulose (CMC), styrene-butadiene rubber (SBR), polyacrylic acid (PAA), or the like, for example.

The positive-electrode active material layer contains positive-electrode active material particles and binder resin. The positive-electrode active material particles are typically particles of metal oxide containing lithium (Li).

The active material layers 22, 23 are provided in a central portion of the electrode sheet 20 in a wide-width manner, for example. As a result, the front surface 21a and the rear surface 21b of the metal foil 21 positioned on both end sides in the width direction are exposed from the active material layers 22, 23.

The second measurement unit 32 measures the thickness of a reference object 60. The reference object 60 has a thickness that is measured in advance and is a foil-like member such as PET foil, for example.

The reference object 60 has a first reference surface 60a and a second reference surface 60b that are opposite each other. The first reference surface 60a and the second reference surface 60b face each other in the first direction in the measurement position. In the measurement position, the first reference surface 60a faces the third displacement meter 321, and the second reference surface 60b faces the fourth displacement meter 322. When the thickness of the reference object 60 is to be measured, the third displacement meter 321 measures the distance from the first reference surface 60a, and the fourth displacement meter 322 measures the distance from the second reference surface 60b.

The supporting member 35 supports the first measurement unit 31 and the second measurement unit 32. The supporting member 35 is provided to surround a conveyance route of the electrode sheet 20. In other words, an opening portion 35a is provided in the supporting member 35, and the conveyance route is provided to pass through the opening portion 35a. The reference object 60 is also disposed in the opening portion 35a.

The supporting member 35 includes a first frame portion 351, a second frame portion 352, a third frame portion 353, and a fourth frame portion 354. The first frame portion 351 and the second frame portion 352 are disposed to be spaced apart from each other in the first direction. The first frame portion 351 and the second frame portion 352 are provided to extend in the second direction.

The first frame portion 351 supports the first displacement meter 311 and the third displacement meter 321 on one side in the first direction. When the first direction is set to the height direction, the first displacement meter 311 and the third displacement meter 321 are supported in the same height position.

The second frame portion 352 supports the second displacement meter 312 and the fourth displacement meter 322 on the other side in the first direction. When the first direction is set to the height direction, the second displacement meter 312 and the fourth displacement meter 322 are supported in the same height position.

The third frame portion 353 connects end portions of the first frame portion 351 and the second frame portion 352 to each other on one side in the second direction. The fourth frame portion 354 connects end portions of the first frame portion 351 and the second frame portion 352 to each other on the other side in the second direction.

Figure 3:
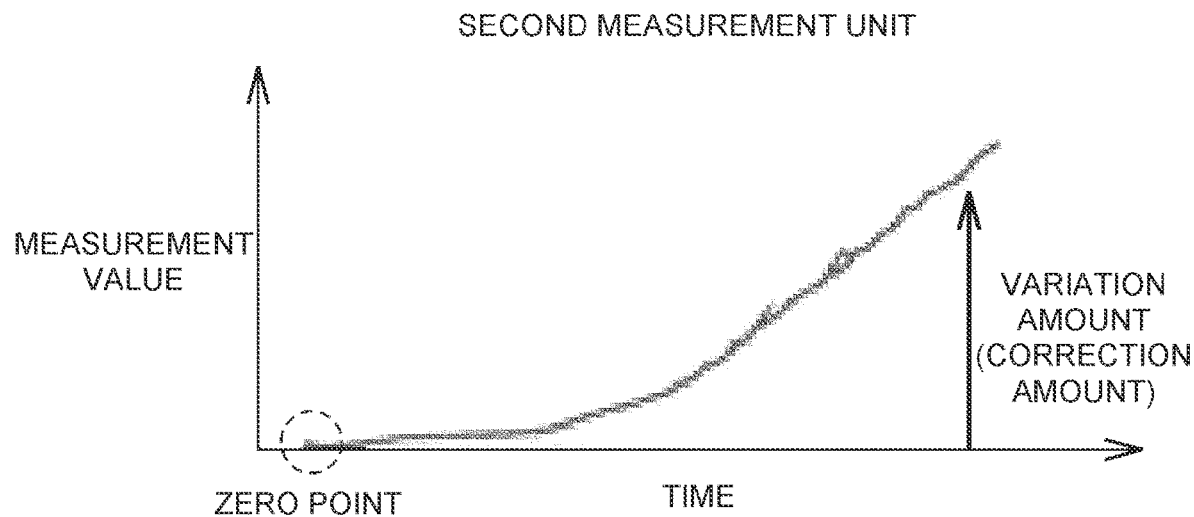
FIG. 3 is a diagram showing a relationship between measurement values and time in a second measurement unit according to the embodiment.

FIG. 3 is a diagram showing a relationship between measurement values and time in the second measurement unit according to the embodiment.

When time elapses, the ambient temperature of the third displacement meter 321 and the fourth displacement meter 322 changes as a result of the third displacement meter 321 and the fourth displacement meter 322 generating heat or the environmental temperature changing. As a result, even when the reference object 60 of which thickness is known in advance is measured by the second measurement unit 32, the measurement value changes as shown in FIG. 3. In the second measurement unit 32, the measurement value measured early on is set to a zero point, and hence a numerical variation amount in accordance with the elapse of time can be detected as a correction amount.

Figure 4:
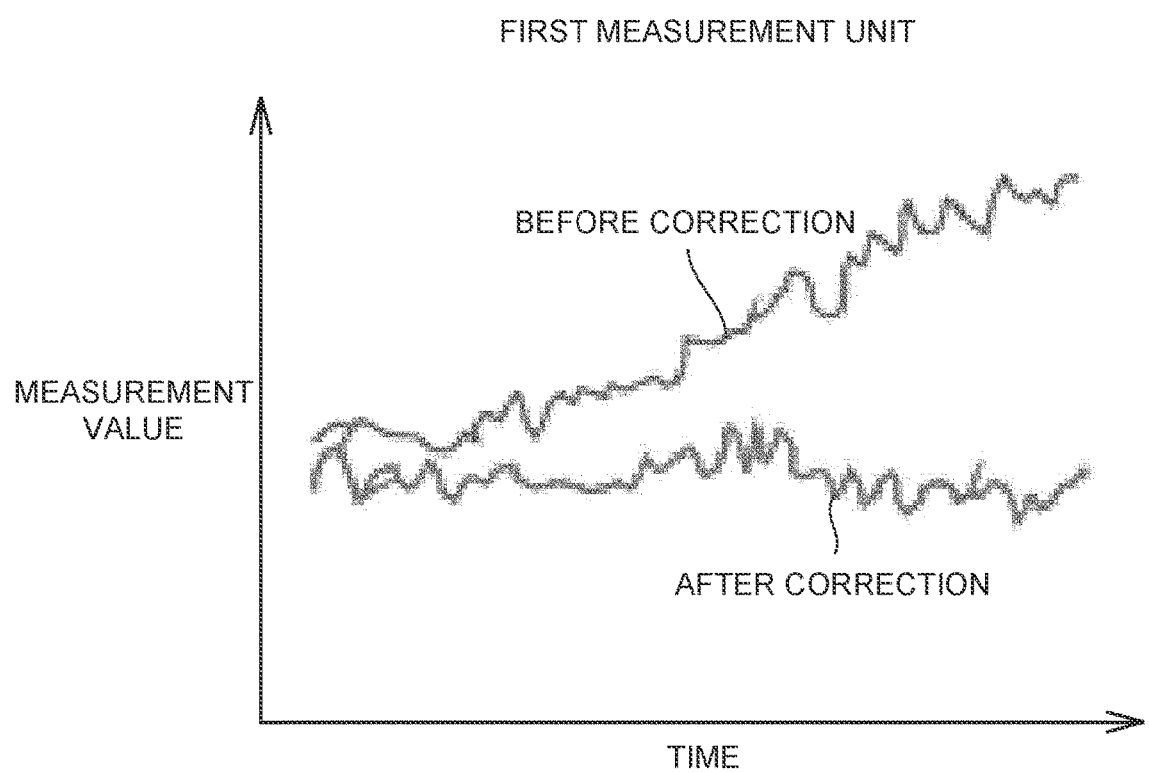
FIG. 4 is a diagram showing a relationship between measurement values and time, and a relationship between measurement values after correction and time in a first measurement unit according to the embodiment.

FIG. 4 is a diagram showing a relationship between measurement values and time, and a relationship between measurement values after correction and time in the first measurement unit according to the embodiment.

Also in a case where the electrode sheet 20 is to be measured by the first measurement unit 31, when time elapses, the ambient temperature of the third displacement meter 321 and the fourth displacement meter 322 changes as a result of the first displacement meter 311 and the second displacement meter 312 generating heat or the environmental temperature changing. Therefore, as shown in FIG. 4, the measurement value may greatly fluctuate in accordance with the elapse of time. In such case, the measurement result (measurement value) obtained by the first measurement unit 31 is corrected on the basis of the correction amount. As a result, measurement can be stably and accurately performed as shown by measurement values after correction. The measurement by the first measurement unit 31 and the measurement by the second measurement unit 32 are simultaneously performed.

Figure 5:
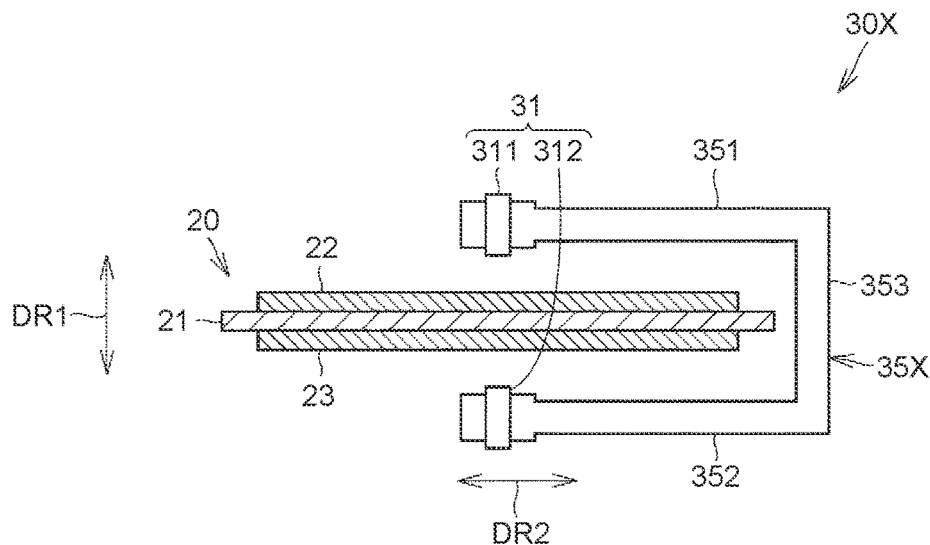
FIG. 5 is a schematic view of a thickness measurement unit according to a comparative example.

FIG. 5 is a schematic view of a thickness measurement unit according to a comparative example. A thickness measurement unit 30X according to the comparative example is described with reference to FIG. 5.

As shown in FIG. 5, the thickness measurement unit 30X according to the comparative example is different from the thickness measurement unit 30 according to the embodiment in that the second measurement unit 32 is not provided and in terms of the shape of a supporting member 35X. Other configurations are substantially similar thereto.

The supporting member 35X supports the first measurement unit 31. The supporting member 35X has a substantially U-like shape having an opening end facing one side in the second direction. The supporting member 35X includes the first frame portion 351, the second frame portion 352, and the third frame portion 353.

The first frame portion 351 and the second frame portion 352 are disposed to be spaced apart from each other in the first direction. The first frame portion 351 and the second frame portion 352 are provided to extend in the second direction. The third frame portion 353 connects end portions of the first frame portion 351 and the second frame portion 352 to each other on one side in the second direction.

End portions of the first frame portion 351 and the second frame portion 352 positioned on the other side in the second direction are positioned in positions that overlap on a central portion of the electrode sheet 20 in the second direction in the first direction. The first displacement meter 311 and the second displacement meter 312 are supported by the end portions of the first frame portion 351 and the second frame portion 352 positioned on the other side in the second direction.

In this case, the ambient temperature of the first frame portion 351 and the second frame portion 352 changes as a result of the first displacement meter 311 and the second displacement meter 312 generating heat or the environmental temperature changing. As a result, the supporting member 35X is thermally deformed. At this time, an end portion of the supporting member 35X positioned on the other side in the second direction is opened toward the other side in the second direction, and hence the thermal deformation amount of the supporting member 35X increases. As a result, positions of the first displacement meter 311 and the second displacement meter 312 fluctuate and a measurement error occurs.

Meanwhile, in this embodiment, both ends of the first frame portion 351 and the second frame portion 352 in the second direction are connected to each other by the third frame portion 353 and the fourth frame portion 354. As a result, even when the supporting member 35 is thermally deformed, the deformation amount of the supporting member 35 can be reduced. As a result, the fluctuation in the positions of the first displacement meter 311 and the second displacement meter 312 and the fluctuation in the positions of the third displacement meter 321 and the fourth displacement meter 322 can be reduced, and the measurement error due to the change of the ambient temperature can be reduced.

Figure 6:
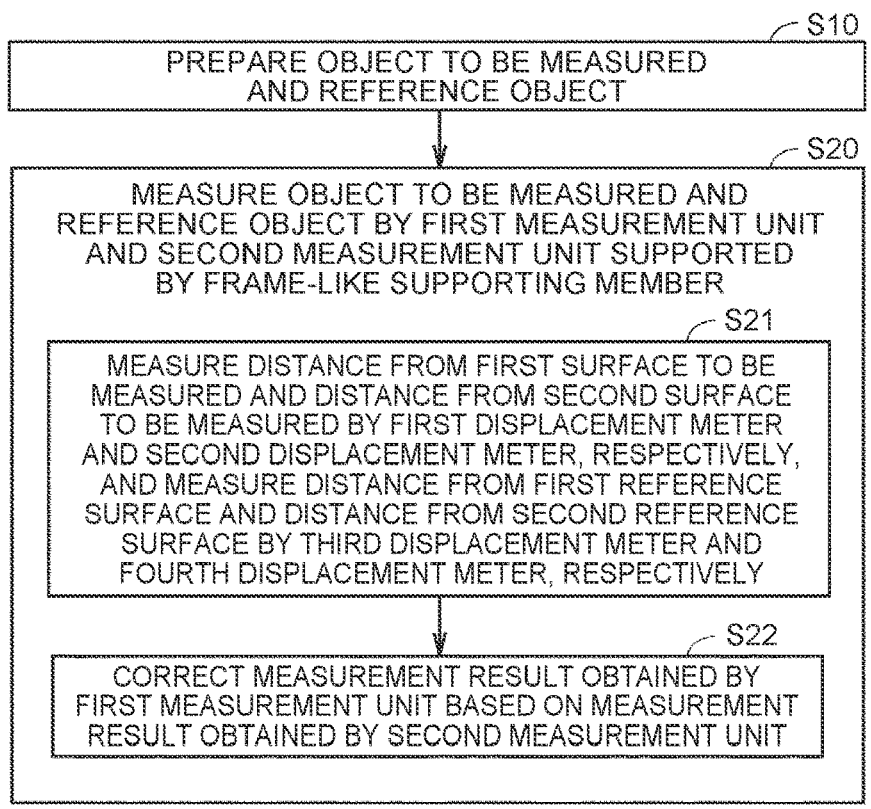
FIG. 6 is a flowchart showing a measurement procedure performed by the thickness measurement unit according to the embodiment.

FIG. 6 is a flowchart showing a measurement procedure performed by the thickness measurement unit according to the embodiment. The measurement procedure performed by the thickness measurement unit 30 according to the embodiment is described with reference to FIG. 6.

As shown in FIG. 6, when an object to be measured is to be measured by the thickness measurement unit 30, the electrode sheet 20 serving as the object to be measured and the reference object 60 are prepared in Step (S10) first. Specifically, in Step (S10), the electrode sheet 20 having the first surface to be measured 20a and the second surface to be measured 20b that are opposite each other, and the reference object 60 having the first reference surface 60a and the second reference surface 60b that are opposite each other are prepared.

At this time, the electrode sheet 20 is disposed such that the first surface to be measured 20a faces the first displacement meter 311 and the second surface to be measured 20b faces the second displacement meter 312. More specifically, the electrode sheet 20 is conveyed to a place between the first displacement meter 311 and the second displacement meter 312.

The reference object 60 is disposed such that the first reference surface faces the third displacement meter 321 and the second reference surface 60b faces the fourth displacement meter 322.

Next, in Step (S20), the electrode sheet 20 and the reference object 60 are measured by the first measurement unit 31 and the second measurement unit 32 supported by a frame-like supporting member 35.

A measurement unit in which the first displacement meter 311 and the second displacement meter 312 are disposed to face each other in the first direction is used as the first measurement unit 31, and a measurement unit in which the third displacement meter 321 and the fourth displacement meter 322 face each other in the first direction is used as the second measurement unit 32. As described above, the frame-like member having the first frame portion 351 that supports the first displacement meter 311 and the third displacement meter 321, the second frame portion 352 that supports the second displacement meter 312 and the fourth displacement meter 322, and the third frame portion 353 and the fourth frame portion 354 that connect both ends of the first frame portion 351 and the second frame portion 352 in the second direction to each other is used as the supporting member 35.

Step (S20) includes Step (S21) and Step (S22). In Step (S21), the distance from the first surface to be measured 20a and the distance from the second surface to be measured 20b are measured by the first displacement meter 311 and the second displacement meter 312, respectively, and the distance from the first reference surface 60a and the distance from the second reference surface 60b are measured by the third displacement meter 321 and the fourth displacement meter 322, respectively.

In Step (S22), the measurement result obtained by the first measurement unit 31 is corrected on the basis of the measurement result obtained by the second measurement unit 32. Specifically, a displacement amount by which the measurement value detected by the second measurement unit 32 is displaced from the zero point is calculated, and the measurement result obtained by the first measurement unit 31 is corrected on the basis of the displacement amount.

As above, in the measurement method according to the embodiment described above, the frame-like supporting member 35 is used as the supporting member that supports the first measurement unit 31 and the second measurement unit 32. As a result, the thermal deformation of the supporting member 35 can be reduced and the measurement error can be reduced when the ambient temperature changes. The measurement result of the first measurement unit 31 is corrected on the basis of the measurement result of the second measurement unit 32. As a result, the thickness of the electrode sheet 20 can be measured in a further accurate manner.

A step of pressing the active material layers 22, 23 provided on both ends of the metal foil 21 is performed when the electrode sheet 20 is manufactured. Next, a step of measuring the thickness of the electrode sheet 20 of which the active material layers 22, 23 are pressed is performed with use of the measurement method. Further, a step of feeding back the thickness of the electrode sheet 20 calculated by the measurement method to the control unit 40 is performed. Then, a step of adjusting the pressure by which the electrode sheet 20 (more specifically, the active material layers 22, 23) is pressed by the control unit 40 on the basis of the fed back value is performed.

The embodiment disclosed above is merely an example in all aspects and in no way intended to limit the disclosure. The scope of the disclosure is defined by the scope of claims. All modifications made within the scope and spirit equivalent to those of the claims are included in the disclosure.

What is claimed is:

1. A measurement method, comprising:
a step of preparing an object to be measured having a first surface to be measured and a second surface to be measured that are opposite each other, and a reference object having a first reference surface and a second reference surface that are opposite each other; and
a step of measuring the object to be measured and the reference object by a first measurement unit and a second measurement unit supported by a frame-like supporting member, wherein:
the first measurement unit has a first displacement meter and a second displacement meter disposed to face each other in a first direction;
the second measurement unit has a third displacement meter and a fourth displacement meter disposed to face each other in the first direction;

the first measurement unit and the second measurement unit are supported by the frame-like supporting member in a state of being arranged side by side in a second direction orthogonal to the first direction;

the step of preparing the object to be measured and the reference object includes disposing the object to be measured such that the first surface to be measured faces the first displacement meter and the second surface to be measured faces the second displacement meter and disposing the reference object such that the first reference surface faces the third displacement meter and the second reference surface faces the fourth displacement meter;

the step of measuring the object to be measured and the reference object includes a step of measuring a distance from the first surface to be measured and a distance from the second surface to be measured by the first displacement meter and the second displacement meter, respectively, and measuring a distance from the first reference surface and a distance from the second reference surface by the third displacement meter and the fourth displacement meter, respectively; and a member including a first frame portion that supports the first displacement meter and the third displacement meter on one side in the first direction, a second frame portion that supports the second displacement meter and the fourth displacement meter on the other side in the first direction, a third frame portion that connects end portions of the first frame portion and the second frame portion to each other on one side in the second direction, and a fourth frame portion that connects end portions of the first frame portion and the second frame portion to each other on the other side in the second direction is used as the frame-like supporting member.

* * * * *